United States Patent
Arditti Ilitzky et al.

(10) Patent No.: US 10,476,731 B2
(45) Date of Patent: *Nov. 12, 2019

(54) JOINT NONCOHERENT DEMODULATION AND CARRIER FREQUENCY OFFSET CORRECTION BASED ON NON-LINEAR FILTERING

(71) Applicant: Intel Corporation, Santa Clara, CA (US)

(72) Inventors: David Arditti Ilitzky, Guadalajara (MX); Rocio Hernandez Fabian, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/777,079

(22) PCT Filed: Oct. 24, 2016

(86) PCT No.: PCT/US2016/058444
§ 371 (c)(1),
(2) Date: May 17, 2018

(87) PCT Pub. No.: WO2017/112072
PCT Pub. Date: Jun. 29, 2017

(65) Prior Publication Data
US 2019/0028322 A1    Jan. 24, 2019

Related U.S. Application Data

(63) Continuation of application No. 14/978,705, filed on Dec. 22, 2015, now abandoned.

(51) Int. Cl.
H04L 27/38    (2006.01)

(52) U.S. Cl.
CPC ...... H04L 27/3863 (2013.01); H04L 27/3872 (2013.01)

(58) Field of Classification Search
CPC ................. H04L 27/3863; H04L 27/3872
See application file for complete search history.

(56) References Cited

U.S. PATENT DOCUMENTS 7,489,746 B1 * 2/2009 Awater ................ H04L 1/06
                                                 375/341
7,809,083 B1    10/2010 Wu et al.
(Continued)

OTHER PUBLICATIONS

PCT International Search Report issued for PCT/US2016/58444, 4 pgs., dated Dec. 1, 2016.

*Primary Examiner* — David S Huang
(74) *Attorney, Agent, or Firm* — Schiff Hardin LLP

(57) ABSTRACT

A wireless device, and corresponding method, having a receiver configured to receive a signal having in-phase and quadrature components; a non-linear filter demodulator configured to translate noncoherently the in-phase and quadrature components into phase and frequency domain signals, and to estimate and correct carrier frequency offset; a coherence signal parameter acquisition unit is configured to estimate and correct at least one correct coherence signal parameter based on the in-phase and quadrature components and the phase or frequency domain signal; and a symbol detector is configured to detect information in the phase or frequency domain signal. If optimal coherent information detection is desired, the at least one signal parameter is not only carrier phase offset and carrier timing offset, but also phase frequency offset, wherein the estimation and correction of the carrier frequency offset performed by the signal parameter acquisition unit is more precise than that performed (Continued)

formed by the non-linear filter demodulator. In such a case the detector is configured to detect information in the phase domain signal.

19 Claims, 3 Drawing Sheets

(56) References Cited

U.S. PATENT DOCUMENTS

| | | |
|---|---|---|
| 9,276,704 B1 | 3/2016 | Arditti Ilitzky et al. |
| 2009/0196163 A1 | 8/2009 | Du |
| 2013/0128822 A1 | 5/2013 | Mittelsteadt et al. |
| 2015/0172086 A1 | 6/2015 | Khoshgard et al. |

* cited by examiner

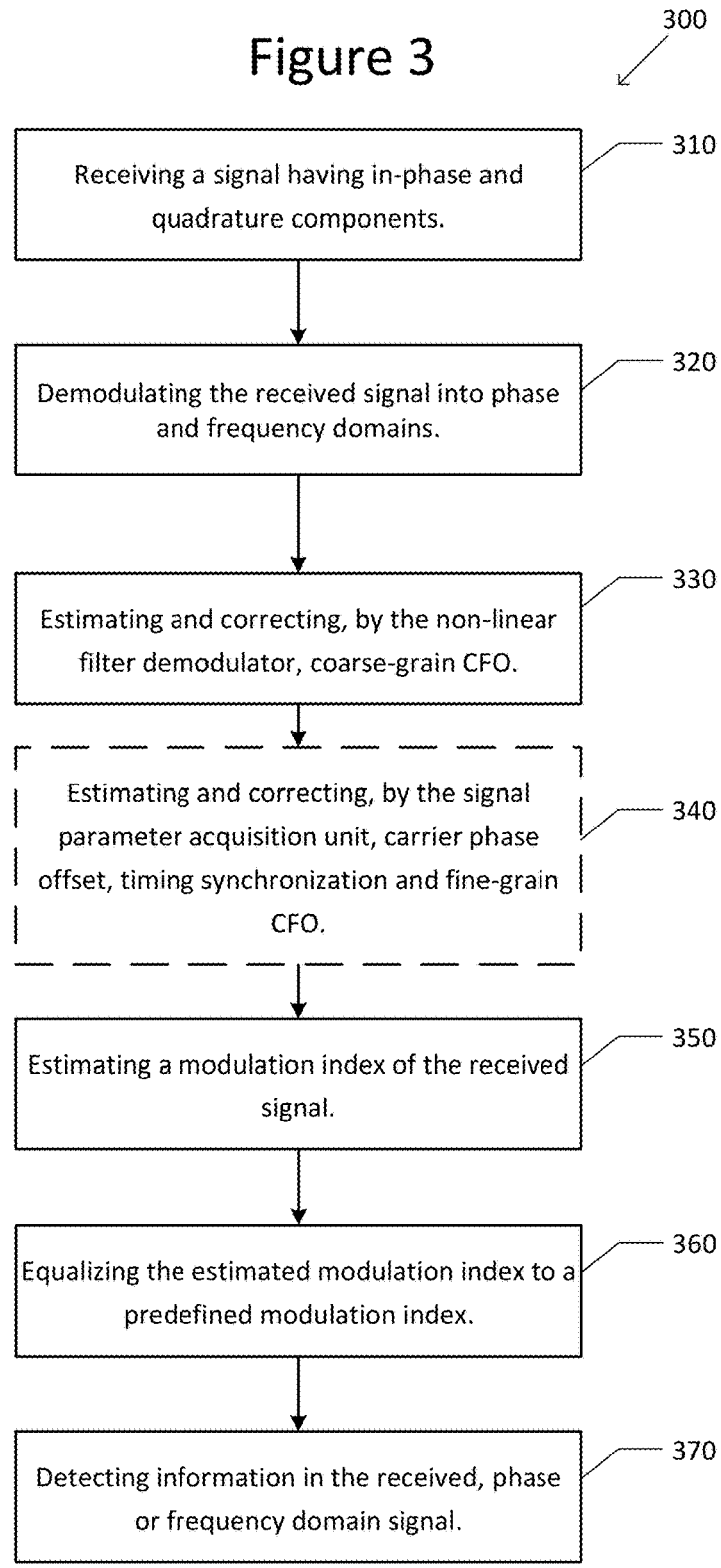

JOINT NONCOHERENT DEMODULATION AND CARRIER FREQUENCY OFFSET CORRECTION BASED ON NON-LINEAR FILTERING

BACKGROUND

Low-power wireless sensor and actor networks (LP-WSAN) standards require low power and a simplified protocol. FIG. 4 illustrates a low-power wireless sensor and actor network 400 having a sensor 410 and an actor 420. The sensors are multifunctional devices that communicate untethered in short distances. The actors are resource-rich devices with higher processing and transmission capabilities, and collect and process sensor information and perform actions based on the information gathered.

A difference between the carrier frequencies of the sensor 410 and the actor 420 is known as Carrier Frequency Offset (CFO). CFO negatively impacts reception performance, and thus CFO estimation and correction are important. Existing solutions for CFO estimation involve complex algorithms that increase power consumption and latency. Moreover, many existing solutions separate the CFO estimation into two parts—coarse-grain estimation and fine-grain estimation. The coarse-grain estimation is carried out using a known packet preamble or a training sequence, whereas the fine-grain estimation is carried out continuously during packet payload reception. As the coarse-grain estimation improves, the fine-grain estimation becomes simpler and has a better performance.

BRIEF DESCRIPTION OF THE DRAWINGS

FIG. 3 illustrates a flowchart of a method of wireless communication.

DESCRIPTION OF THE EMBODIMENTS

Figure 1:
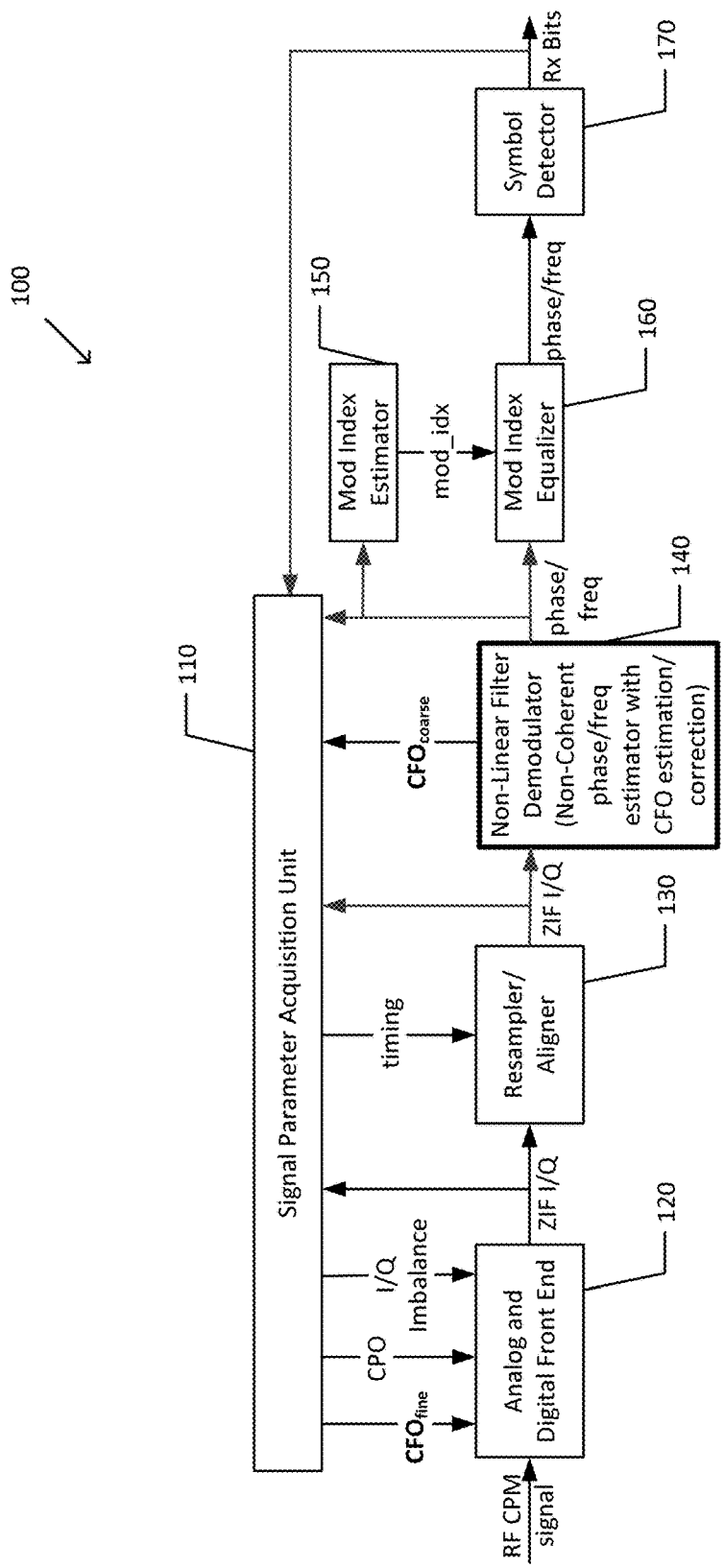
FIG. 1 illustrates a schematic diagram of a wireless device.

The present disclosure is directed to a wireless device, along with a corresponding method, having a receiver, a non-linear filter demodulator, a signal parameter acquisition unit, and a symbol detector. The receiver is configured to receive a signal having in-phase and quadrature components. The non-linear filter demodulator is configured to translate noncoherently the in-phase and quadrature components into phase and frequency domain signals, and to estimate and correct carrier frequency offset (CFO). The signal parameter acquisition unit is configured to estimate and correct at least one signal parameter based on the in-phase and quadrature components and the phase or frequency domain signal. The coherent detector is configured to detect information in the phase or frequency domain signal.

The nonlinear filter demodulator performs CFO estimation and correction that is coarse-grain ($CFO_{coarse}$). No extra block/algorithm is required for coarse-grain CFO estimation and correction, as it is handled by the non-linear filter demodulator jointly with the demodulation. The result is a simpler signal parameter acquisition unit, reducing latency and power consumption, and improving performance.

If more optimal information detection is desired for a more sensitive application, the signal parameter acquisition unit, or another suitable unit, may additionally perform CFO estimation and correction that is fine-grain ($CFO_{fine}$). As is known, fine-grain CFO estimation and correction is more precise than coarse-grain CFO estimation and correction. If fine-grain CFO estimation and correction is performed, the detector may be configured to detect information in the phase domain signal, otherwise the detector may be configured to detect information in a frequency domain signal.

Thus, by way of overview and as described in more detail below, depending on the sensitivity of the application, there are three different possible configurations based on the level of performance desired—best performance, mid-level performance, and lowest performance. The best performing configuration has the non-linear filter demodulator 140 configured to perform noncoherent demodulation and coarse-grain CFO estimation and correction. The signal parameter acquisition unit 110 is configured to perform fine-grain CFO estimation, carrier phase offset correction, and timing synchronization. The detector 170 is configured to perform coherent maximum likelihood sequence detection (MLSD) in the phase domain.

The mid-level performance configuration is for a situation where phase coherency is not required. This configuration has the non-linear filter demodulator 140 configured to perform noncoherent demodulation and coarse-grain CFO estimation and correction, as in the best performing situation. The signal parameter acquisition unit 110 is configured to perform fine-grain CFO estimation, and timing synchronization, but not carrier phase offset estimation, contrary to the best-performing situation. The detector 170 is configured to perform MLSD in the frequency domain, not the phase domain as in the best performance configuration.

The lowest performance configuration is for a situation where no phase coherency is required and some CFO is tolerable. This configuration has the non-linear filter demodulator 140 configured to perform noncoherent demodulation and coarse-grain CFO estimation and correction, as in the best and mid-level performance situations. The signal parameter acquisition unit 110 is configured to perform timing synchronization estimation only, but not fine-grain CFO or carrier phase offset estimation. The detector 170 is configured to perform non-coherent symbol detection in the frequency domain, not MLSD as in the in the best and mid-level performance configurations.

These configurations are summarized in the following Table 1:

TABLE 1

| NLF demodulator | | Signal parameter acquisition unit | | | | |
|---|---|---|---|---|---|---|
| Non-coh demod | Coarse-grain CFO est & corr | Fine-grain CFO est & corr | CPO corr | Timing synch | Mod Index est & corr | Detector Configuration |
| Yes | yes | yes | yes | Yes | Yes | Best Performance: MLSD in phase domain. Phase-coherent (i.e., same phase and frequency) between transmitter and receiver carrier signals. |

TABLE 1-continued

| NLF demodulator | Signal parameter acquisition unit | | | | | |
| --- | --- | --- | --- | --- | --- | --- |
| Non-coh demod | Coarse-grain CFO est & corr | Fine-grain CFO est & corr | CPO corr | Timing synch | Mod Index est & corr | Detector Configuration |
| Yes | yes | yes | no | Yes | No | Mid-Level Performance: MLSD in frequency domain. Coherent (i.e., same frequency and constant phase difference) between transmitter and receiver carrier signals. |
| Yes | yes | no | no | yes | No | Lowest Performance: Detector does not use MLSD; uses other, less expensive algorithm (e.g., non-coherent correlation based detection). |

FIG. 1 illustrates a schematic diagram of a wireless device 100.

The wireless device 100 may include a receiver (110, 120, and 130), a non-linear filter demodulator 140, a modulation index estimator 150, a modulation index equalizer 160, and a detector 170. The receiver includes a signal parameter acquisition unit 110, an analog and digital front end 120, and a resampler/aligner 130.

The analog and digital front end 120 is configured to receive a continuous phase modulation (CPM) single carrier radio frequency (RF) signal, down-convert the RF signal's frequency to a low frequency, and deterministically filter out undesired frequency bands. The output of the analog and digital front end 120 is a digital baseband signal having a zero intermediate frequency (ZIF) and in-phase and quadrature components. The analog and digital front end 120 also receives from the signal parameter acquisition unit 110 inputs, that is, carrier phase offset (CPO) correction/compensation value, I/O imbalance correction/compensation value, and optionally fine-grain carrier frequency offset correction/compensation value ($CFO_{fine}$), which are parameters that are configured in the analog or digital domain, in a known manner, to enable the corrections of these parameters. The signal parameter acquisition unit 110 is configured to estimate the correction/compensation values for I/O imbalance, CPO, and fine-grain CFO, though the disclosure is not limited in this respect. These parameters may be corrected in any other component as suitable.

The signal parameter acquisition unit 110 is configured to forward the estimated fine-grain CFO, carrier phase offset correction values to the analog and digital front end unit 120, where they are corrected. The signal parameter acquisition unit 110 is also configured to forward the estimated timing synchronization value to the resampler/aligner 130, where it is corrected.

The resampler/aligner 130 is instructed by the signal parameter acquisition unit 110, based on timing parameters, to align sampling instants, at a desired sampling rate, with optimal locations with respect to symbol boundaries. The resampler/aligner 130 is disclosed as being located between the analog and digital front end 120 and the non-linear filter demodulator 140, but the disclosure is not limited in this respect. This resampling/aligning is also known and need not be described further here.

The non-linear filter demodulator 140 is configured to demodulate the received I/O baseband signal into phase and frequency domain signals. If the non-linear filter demodulator 140 is optimal, the noise at its output, including demodulation errors, is white and Gaussian. Additive White Gaussian Noise (AWGN) is a basic noise model mimicking the effect of random processes that occur in nature. The modifiers denote specific characteristics: "additive" because it is summed linearly with the signal; "white" because it has uniform power across the frequency band; and "Gaussian" because it has a probability distribution that is Gaussian, or normal.

When there is a difference between the carrier frequencies of the transmitter and receiver, it means that there is an instantaneous modulating frequency that is offset by a constant of CFO units. To maintain good performance, the model used for the non-linear filter demodulator 140 is augmented with a scalar or vectorial state for the CFO, such that the non-linear filter demodulator 140 produces a frequency estimate which has a coarse-grain correction for CFO. The estimation and correction of coarse-grain CFO may be sufficient for less sensitive, high signal strength cases. For more sensitive applications the signal parameter acquisition unit 110 may be configured to perform estimation and determination of the correction/compensation value of fine-grain CFO. The fine-grain CFO correction may be implemented as an automatic frequency correction based on a feedback of the coarse-grain estimated CFO from the non-linear filter demodulator 140 to the signal parameter acquisition unit 110.

The I/O baseband signal received by the non-linear filter demodulator 140 is represented by Equation 1 as follows:

$$S_{LP}(t)=\cos\,[\theta(t)]+j\,\sin\,[\theta(t)]=\cos\,[h\varphi(t)]+j\,\sin\,[h\varphi(t)] \quad \text{(Equation 1)}$$

where $\theta(t)$ is the CPM phase domain modulating signal, h is the modulation index, and $\varphi(t)$ is normalized CPM phase domain modulating signal. From the I/O baseband signal, the non-linear filter demodulator 140 performs a non-coherent angle demodulation, that is, estimation of the instantaneous phase and/or frequency modulating signals. This demodulation does not require timing or coherency acquisition, or the information carried by the phase. The non-linear filter demodulator 140 estimates the phase and frequency as a function of time. The output function in Equation (1) is invertible, so the phase is observable. As the non-linear filter demodulator 140 becomes closer to optimal, the estimation error becomes more white and Gaussian. Thus, the demodulation will result in an ideal phase modulating signal with white Gaussian noise, as indicated by Equation 2 as follows:

$$\hat{\theta}(t) \xrightarrow[NLF \to optimal]{} \theta(t) + n(t) \quad \text{(Equation 2)}$$

where θ(t) is the CPM modulating signal and n(t) is white Gaussian noise. Moreover, as a direct consequence of the non-linear filtering, the signal-to-noise ratio (SNR) in the phase domain (output of non-linear filter) is higher than the SNR on the I/O domain (input of non-linear filter).

The signal parameter acquisition unit 110 uses the signal phase and frequency output by the non-linear filter demodulator 140 to determine the signal timing, that is, where transmitted symbols start and end, and this information is fed to the sampler/aligner 130. The coherency acquisition (i.e., CFO, CPO correction, symbol timing recovery, modulation index equalization, etc.) and timing acquisition are executed in the phase or frequency domains linearly, whereas in the I/Q domain the processing is non-linear.

The modulation index estimator 150 is configured to estimate a modulation index of the received signal. The modulation index specifies the maximum frequency deviation from the carrier frequency due to the modulation. Because the signal is now in the phase domain, it is now a simpler linear problem to estimate the modulation index. The estimation may be any linear estimation technique for unknown linear coefficients, such as least-squares, recursive-least-squares, constrained-least-squares, maximum likelihood estimation, etc. Alternatively, other linear methods might yield a better continuous estimation of the modulation index if the modulation index is expected to vary within a packet.

The modulation index equalizer 160 is configured to equalize the estimated modulation index, mod_idx, into a predefined modulation index. The predefined modulation index may be, for example, 0.5, which is a value that improves performance and minimizes complexity because it represents a trellis structure with a small number of states required in a MLSD phase domain detector. In the phase domain the equalization of the modulation index to a predefined modulation index is a much simpler linear problem.

Any detector configuration (i.e., best, mid-level and lowest) described above and included in Table 1, may use the modulation index estimator 150 and the modulation index equalizer 160. However, the best detector configuration is the only detector configuration that requires the modulation index estimator 150 and the modulation index equalizer 160.

The detector 170 may be a Maximum Likelihood Sequence Detector (MLSD), which performs a mathematical algorithm for optimally extracting useful information sequences out of the noisy received CPM signal, a MLSD can be used because the signal is in the phase domain, has a known modulation index, additive white Gaussian noise, and a better SNR than the original SNR in the I/O domain. MLSD performed in the phase domain reduces the complexity because analysis is on only one signal (phase signal) instead of two signals (I and Q signals). The predefined value of the modulation index is chosen to minimize complexity in the MLSD implementation while still guaranteeing a good BER/PER performance.

The detector 170 may be configured to perform MLSD in either phase domain or frequency domain. If the detector 170 performs MLSD in the phase domain, there is better performance, but coherent reception is needed so CPO must be estimated and corrected. Alternatively, if the detector 170 performs MLSD in the frequency domain, the signal parameter acquisition unit 110 does not need to perform CPO estimation and correction because full coherency is not required thus reducing the overall complexity. MLSD in the phase domain has a higher performance (i.e., a lower Bit Error Rate/Packet Error Rate (BER/PER)), while MLSD in the frequency domain has a lower computational complexity. Thus the mid-level detector configuration described above offers an interesting tradeoff option.

Figure 2:
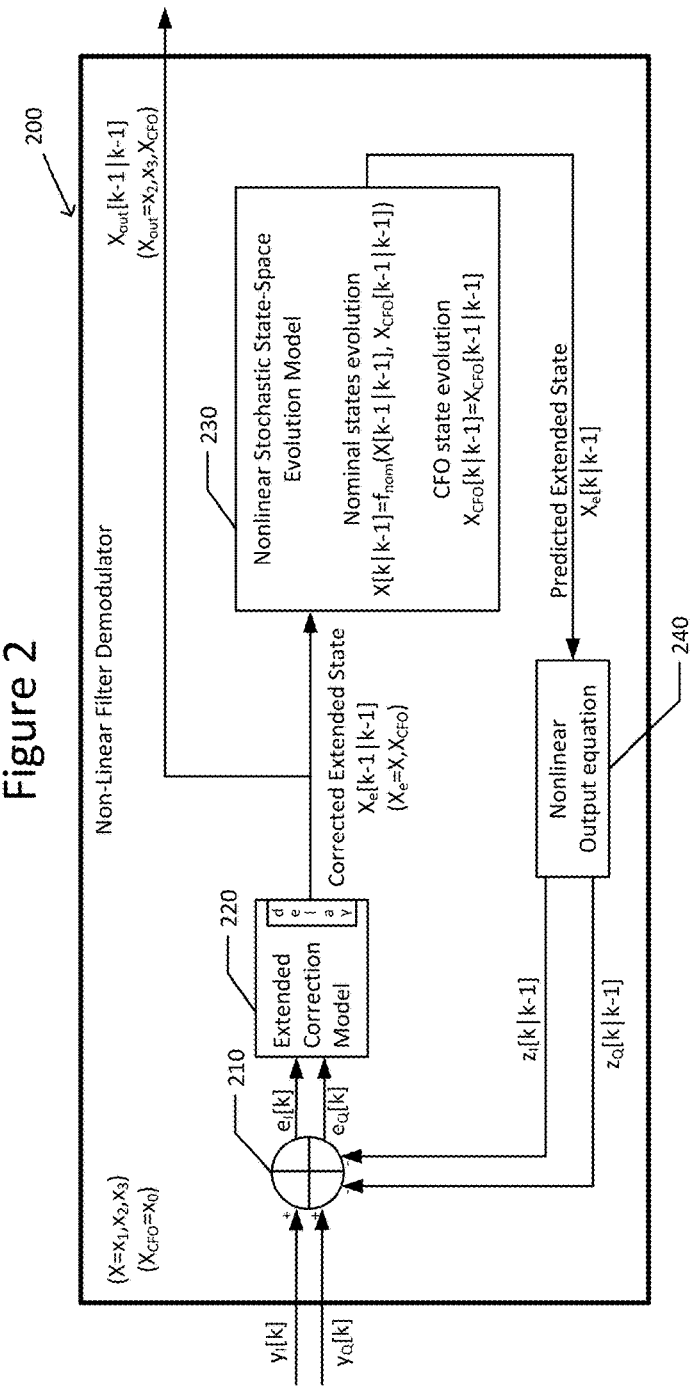
FIG. 2 illustrates a schematic diagram of a generic non-linear filter demodulator.
Figure 4:
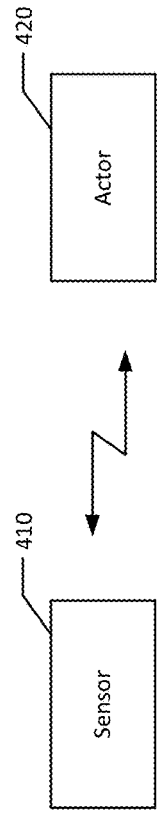
FIG. 4 illustrates a schematic diagram of a low-power wireless sensor and actor network.

FIG. 2 illustrates a schematic diagram of a generic non-linear filter demodulator 200, which is used to develop the non-linear filter demodulator 140 of FIG. 1 using Markov stochastic process modeling.

The generic non-linear filter demodulator structure 200 includes an adder 210, an extended correction model 220, a nonlinear stochastic state-space evolution model 230, and a non-linear output equation 240. By way of overview, the structure 200 has a feedback function that varies with time in accordance with an output prediction quadrature error, $e_I$ and $e_Q$. The predicted extended state vector is used to predict a quadrature output $z_I$, $z_Q$, and then compares $z_I$, $z_Q$ with the actual quadrature measurements, $y_I$, $y_Q$, and there will be an error, $e_I$, $e_Q$, in the prediction. Based on this prediction error, there is a model correction that updates the extended state vector estimates. Updated estimates at a time k are produced given all of the measurements up to time k. There is a delay unit in the extended correction model 220 for timing synchronization purposes, as is understood by those of ordinary skill. Estimation based on state-space models, as opposed to input/output models, is more suitable because the output in CPM relates non-linearly to the information signal.

Nonlinear filtering based on Markov process theory first requires the creation of a stochastic state-space evolution model 230 that represents the target signal (instantaneous phase and frequency) and the measured signal (ZIF signal) up to the statistics order that the filter requires. Without the coarse-grain CFO estimation and correction, a general Markov process model is represented in Equations (3)-(5), as follows:

$$\dot{x} = f(x) + g(x)w_p \quad \text{(Equation 3)}$$

$$z = h(x) \quad \text{(Equation 4)}$$

$$y = z + w_m \quad \text{(Equation 5)}$$

where $w_p$ and $w_m$ are independent white Gaussian noise, that is, the process noise and measurement noise, respectively, x is the process state vector of the evolution equation, z is the output, and y is the measurement. Measurement noise, $w_m$, is the noise being filtered out.

By exploiting properties of the CPM signal, a generalized structure for the CPM Markov model can be developed as follows:

1) Because the ideal received signal will have the form of equation (1), and the Markov model for a clean output without measurement noise should comply with equation (4), equations (1) and (4) are equivalent. Also, the target signal, θ(t), should be part of the state vector x.

2) Three sets of state variables are used for the state-space model for the general CPM signal. The state x of Equation (3) above is comprised by these three sets of variables, that is, a set of auxiliary variables $x_1$, a set of instantaneous frequency variables $x_2$, and a set of instantaneous phase variables $x_3$, which are described in more detail below.

2a) The first set of state variables $x_1$ are auxiliary variables for the creation of a multinomial (or poly-modal with thin spread of each mode) distribution to model the source of information. $x_1(t)$ is a Gaussian correlated process with very short correlation time.

2b) The second set of state variables $x_2$ model instantaneous frequencies:

$$x_2(t) \triangleq h \vartheta(t) \quad \text{(Equation 6)}$$

2c) The third set of state variables $x_3$ are an integral of the instantaneous frequencies, and model instantaneous phases:

$$x_3(t) \triangleq \theta(t) \quad \text{(Equation 7)}$$

3) Derivation of the evolution equation for the state vector:

3a) $x_1(t)$ provides, as a set of state variables, a quasi-noise process. From Doob's theorem for a Gauss-Markov process, a single set of state variables with linear drift, $f_1 \cdot x_1$, and constant diffusion, $g_1$, is required to generate an exponentially correlated Gaussian process, and the correlation can have an arbitrary relaxation time. Thus it can be made arbitrarily close to a delta-correlated process. For this reason, the evolution equation for the quasi-noise process is as follows:

$$\dot{x}_1 = f_1 \cdot x_1 + g_1 \cdot w_p \quad \text{(Equation 8)}$$

3b) A transformation function of $x_1$ feeds the $x_2$ evolution, $\rho(x_1)$, is required for the statistical modelling the M-ary symbol process (M-modal) at the input to the CPM modulator. A nonlinear static, that is, memory-less, function having a finite set of output values will enable the translation of the quasi-noise process distribution, into an M-modal (or multinomial) quasi-white process without imprinting memory into it. One such function is the sign function, for example, a binary modulation has a binomial distribution with equal probability for the +1 and −1 values that can be modelled with the sign function applied to the quasi-noise process. Alternatively, smoother functions can be used as the sigmoid functions and logistic functions:

$$\rho(x_1): \mathcal{R} \rightarrow \left\{ -\left(\frac{M}{2}\right), -\left(\frac{M}{2}-1\right), \ldots, \left(\frac{M}{2}-1\right), \left(\frac{M}{2}\right) \right\} \quad \text{(Equation 9)}$$

3c) $x_2(t)$ provides statistics of the CPM frequency modulating signal. This is modelled through a feedback (nonlinear) pulse shaping function $f_2(x_2)$ for the state variables, with the same response as the CPM pulse shaping function, translates the M-modal quasi-white process:

$$\dot{x}_2 = f_{NL2}(x_2, x_1) := f_2(x_2) + \rho(x_1) \quad \text{(Equation 10)}$$

3d) $x_3(t)$ provides statistics of the CPM phase modulating signal. Because $x_2$ already models the instantaneous frequency, instantaneous phase can be obtained simply by integration:

$$\dot{x}_3 = x_2 \quad \text{(Equation 11)}$$

4) The measurement operator is then $h(\cdot) = \cos(\cdot) + j \sin(\cdot)$ applied to the instantaneous phase signal $x_3(t)$ as follows:

$$z = \cos(x_3) + j \sin(x_3) \quad \text{(Equation 12)}$$

With this procedure, a Markov process model for any type of CPM signal can be designed in order to apply Markov nonlinear filtering theory to demodulate the signal near optimally. The concatenation of all the previously described sets of state variables composes the nominal state vector for the nominal Markov model without CFO disturbance. The nominal state vector is defined as $X = [x_3^T, x_2^T, x_1^T]^T$, where the T represents a transpose operator.

In order to include the coarse-grain CFO estimation and correction into the non-linear filter demodulator 140/200, the nonlinear stochastic state-space evolution model 230 is extended to include the CFO disturbance by extending the nominal state vector X, to include $x_0$ (representing the CFO), thus resulting in an extended state vector, $X_e = [x_3^T, x_2^T, x_1^T, x_0^T]^T$, which models the coarse-grain CFO effect. The extended non-linear filter demodulator 140/200 is configured to perform joint demodulation and coarse-grain CFO estimation and correction. Its mathematical relations are shown in Table 2 below.

TABLE 2

| Signal | General Expression | State Space Representation | Interpretation of State |
|---|---|---|---|
| Instantaneous Perturbed Normalized Phase | $\Theta_{pert}(t) = 2\pi h \int_{-\infty}^{t} \vartheta(t)dt + \int_{-\infty}^{t} 2\pi f_{CFO}$  $f_{CFO}$ is a constant | $\dot{x}_3 = \pi_2 x_2 + \pi_0 x_0$ $\pi_2$ and $\pi_0$ are constants | $x_3 = \Theta_{pert}$ |
| Instantaneous Frequency (Nominal) | $\vartheta(t) = 2\pi \sum_{k=0}^{n} \alpha_k g(t - kT_s)$  $\alpha_k = \{1, 1, -1, \ldots\}$  g(t) is the pulse shaping filter | $\dot{x}_2 = f_{NL2}(x_2, x_1)$ | $x_2 = \vartheta$ |
| Auxiliary State Variables | | $\dot{x}_1 = f_1 \cdot x_1 + g_1 \cdot \omega_p$ | |
| CFO (constant) | $X_{CFO} = f_{CFO}$ | $\dot{x}_0 = 0$ | $x_0 = X_{CFO}$ |
| Output I-Q | $S_{LP}(t) = \cos(\Theta_{pert}(t)) + j \sin(\Theta_{pert}(t))$ | $z_I = \cos(x_3)$ $z_Q = \sin(x_3)$ | $z_I = \text{Re}\{S_{LP}\}$ $z_Q = \text{Im}\{S_{LP}\}$ |

Table 2 lists the evolution equations for all the nominal state vector variables $x_1, x_2$, and $x_3$, the evolution equation for the CFO state variables $x_0$, and the output equation for $z_I$ and $z_Q$. Table 1 also illustrates that the instantaneous frequency signal ($f_{NL2}(x_2, x_1)$) is in general a non-linear function to enable modeling non-Gaussian statistics. Furthermore it can be seen that the function $f_{nom}(X, X_{CFO})$ shown inside the nonlinear stochastic state-space evolution model 230 in FIG. 2 is implicitly defined by the evolution equations of the nominal state vector variables in Table 2. Moreover, it can be seen that in this model, to estimate the CFO implies an increment in only one or two states (one state to model constant CFO, the second state to model slowly varying CFO). Because CFO is an unknown parameter, that is, a constant or a very slowly varying quantity, CFO is modeled as a static variable, that is, its rate of change in time is near zero. The CFO evolution is thus independent of all other state variables, thereby simplifying the complexity.

FIG. 3 illustrates a flowchart 300 of a method of wireless communication.

At Step 310, the receiver (110, 120, and 130) of the wireless device 100 receives a signal having in-phase and quadrature components.

At Step 320, the non-linear filter demodulator 140 demodulates the received signal into phase and frequency domains.

At Step 330, the non-linear filter demodulator 140 estimates and corrects coarse-grain carrier frequency offset.

At Step 340, optionally if optimal information detection is desired, the signal parameter acquisition unit 110 estimates and corrects not only carrier phase offset and timing offset, but also fine-grain carrier frequency offset, wherein the estimation and correction of the carrier frequency offset performed by the signal parameter acquisition unit 110 is more precise than that performed by the non-linear filter demodulator 140. In such a case the detector 170 detects information in the phase domain signal.

At Step 350, the modulation index estimator 150 may estimate a modulation index of the received signal. This estimating may be, for example, a least-squares estimating, as discussed above.

At Step 360, the modulation index equalizer 160 may equalize the estimated modulation index to a predefined modulation index. The predefined modulation index may be, for example, 0.5.

At Step 370, the symbol detector 170 detects information sequences in the received signal, as discussed above.

The method of the flowchart 300 of FIG. 3 may be implemented in an application specific integrated circuitry. Alternatively, a computer program product embodied on a non-transitory computer-readable medium comprising program instructions may be configured such that when executed by processing circuitry cause the processing circuitry to implement the method of the flowchart 300 of FIG. 3.

The wireless device 100 and method 300 disclosed herein enable near optimal sequence detection irrespective of the modulation index variation, improves the signal-to-noise ratio at the input of the MLSD detector 170, and enables a less expensive and easier estimation of the modulation index, timing parameters and coherence parameters due to the demodulation from the I/Q domain to the phase domain. The result is lower BER/PER, and lower power consumption due to fewer retransmissions, even with a low-cost radio frequency analog front end.

The subject matter of this disclosure reduces power consumption because a separate, highly-complex CFO estimation and correction is avoided. The complexity for the non-linear filter demodulator algorithm is shared between demodulation and the coarse-grain CFO estimation and correction. Moreover, no signal buffering is required as the algorithm continuously refines its result. For a receiver with less stringent sensitivity requirements, where the coarse-grain CFO estimation and correction is enough, that is, the fine-grain CFO estimation and correction by the signal parameter acquisition unit is not required.

Further, latency is reduced. The coarse-grain CFO estimation and correction is performed by the non-linear filter demodulator 140, without signal buffering, so there is no latency penalty. Only a short amount of time required for the non-linear filter demodulator convergence.

Moreover, the performance is adaptive. For a highly-sensitive application, a fine-grain CFO estimation and correction step may be performed by the signal parameter acquisition unit 110, that is, outside of nonlinear filter demodulator 110. As the CFO remainder of the nonlinear filter based coarse-grain estimation and correction is guaranteed to be bounded, the fine-grain CFO estimation and correction can be optimized for small CFO ranges and thus achieve better CFO correction.

Example 1 is a wireless device, comprising a receiver configured to receive a signal having in-phase and quadrature components; a non-linear filter demodulator configured to translate noncoherently the in-phase and quadrature components into phase and/or frequency domain signals, and to estimate and correct carrier frequency offset; a signal parameter acquisition unit configured to estimate and correct at least one signal parameter based on the in-phase and quadrature components and the phase and/or frequency domain signal; and a detector configured to detect information in the phase and/or frequency domain signal.

In Example 2, the subject matter of Example 1, wherein the signal parameter acquisition unit configured to estimate and correct the carrier frequency offset, carrier phase offset, and carrier timing offset based on the in-phase and quadrature components and the phase and/or frequency domain signal, the estimation and correction of the carrier frequency offset performed by the signal parameter acquisition unit is more precise than that performed by the non-linear filter demodulator, and the detector is further configured to detect information in the phase domain signal.

In Example 3, the subject matter of Example 1, wherein the signal parameter acquisition unit configured to estimate and correct carrier phase offset and carrier timing offset based on the in-phase and quadrature components and the phase and/or frequency domain signal, and the detector is further configured to detect information in the phase domain signal.

In Example 4, the subject matter of Example 1, wherein the signal parameter acquisition unit configured to estimate and correct carrier timing offset based on the in-phase and quadrature components and the frequency domain signal, and the detector is further configured to detect information in the frequency domain signal.

In Example 5, the subject matter of Example 1 can optionally include an estimator configured to estimate a modulation index of the received signal; and an equalizer configured to equalize the estimated modulation index to a predefined modulation index.

In Example 6, the subject matter of Example 1, wherein the detector is a Maximum Likelihood Sequence Detector (MLSD).

In Example 7, the subject matter of Example 1, wherein the nonlinear filter demodulator is based on a model comprising a constant carrier phase offset and a plurality of sets of variables comprising a set of auxiliary variables, a set of instantaneous frequency variables, and a set of instantaneous phase variables.

Example 8 is a wireless communication network comprising a first wireless device, which is the wireless device of claim 1; and a second wireless device communicating with the first wireless device.

In Example 9, the subject matter of Example 8, wherein the wireless communication network is a low-power wireless sensor and actor network (LP-WSAN), the first wireless device is an actor, and the second wireless device is a sensor.

Example 10 is a method of wireless communication, comprising receiving, by a receiver, a signal having in-phase and quadrature components; translating noncoherently, by a non-linear filter demodulator, the in-phase and quadrature components into phase and/or frequency domain signals; estimating and correcting, by the non-linear filter demodulator, carrier phase offset; estimating and correcting, by a signal parameter acquisition unit, at least one signal parameter based on the in-phase and quadrature components and the phase and/or frequency domain signal; and detecting, by a detector, information in the phase and/or frequency domain signal.

In Example 11, the subject matter of Example 10, wherein the at least one signal parameter is the carrier frequency offset, carrier phase offset, and carrier timing offset, estimating and correcting, by the signal parameter acquisition unit, is of the carrier frequency offset, carrier phase offset, and carrier timing offset based on the in-phase and quadrature components and the phase and/or frequency domain signal, the estimating and correcting of the carrier frequency offset performed by the signal parameter acquisition unit is more precise than that performed by the non-linear filter demodulator, and the detecting is detecting information in the phase domain signal.

In Example 12, the subject matter of Example 10, wherein the estimating and correcting, by the signal parameter acquisition unit, is of carrier phase offset and carrier timing offset based on the in-phase and quadrature components and the phase and/or frequency domain signal, and the detecting is detecting information in the phase domain signal.

In Example 13, the subject matter of Example 10, wherein the estimating and correcting, by the signal parameter acquisition unit, is of carrier timing offset based on the in-phase and quadrature components and the frequency domain signal, and the detecting is detecting information in the frequency domain signal.

In Example 14, the subject matter of Example 10 can optionally include estimating, by an estimator, a modulation index of the received signal; and equalizing, by an equalizer, the estimated modulation index to a predefined modulation index.

In Example 15, the subject matter of Example 10, wherein the detecting step is performed using Maximum Likelihood Sequence Detection (MLSD).

Example 16 is a computer program product embodied on a non-transitory computer-readable medium comprising program instructions configured such that when executed by processing circuitry cause the processing circuitry to implement the method of Example 10.

Example 17 is a wireless device, comprising a receiving means for receiving a signal having in-phase and quadrature components; a non-linear filtering demodulating means for translating noncoherently the in-phase and quadrature components into phase and/or frequency domain signals, and for estimating and correcting carrier frequency offset; a signal parameter acquisition means for estimating and correcting at least one signal parameter based on the in-phase and quadrature components and the phase and/or frequency domain signal; and a detection means for detecting information in the phase and/or frequency domain signal.

In Example 18, the subject matter of Example 17, wherein the signal parameter acquisition means is for estimating and correcting the carrier frequency offset, carrier phase offset, and carrier timing offset based on the in-phase and quadrature components and the phase and/or frequency domain signal, the detecting means is further for detecting information in the phase domain signal.

In Example 19, the subject matter of Example 17, wherein the signal parameter acquisition means is for estimating and correcting carrier phase offset and carrier timing offset based on the in-phase and quadrature components and the phase and/or frequency domain signal, and the detecting means is further for detecting information in the phase domain signal.

In Example 20, the subject matter of Example 17, wherein the signal parameter acquisition means is for estimating and correcting carrier timing offset based on the in-phase and quadrature components and the frequency domain signal, and the detector is further for detecting information in the frequency domain signal.

In Example 21, the subject matter of Example 17 can optionally include an estimating means for estimating a modulation index of the received signal; and an equalizing means for equalizing the estimated modulation index into a predefined modulation index.

In Example 22, the subject matter of Example 17, wherein the detection means is a Maximum Likelihood Sequence Detector.

In Example 23, the subject matter of any of Examples 1-4 can optionally include an estimator configured to estimate a modulation index of the received signal; and an equalizer configured to equalize the estimated modulation index to a predefined modulation index.

In Example 24, the subject matter of any of Examples 1-4, wherein the detector is a Maximum Likelihood Sequence Detector (MLSD).

In Example 25, the subject matter of any of Examples 1-4, wherein the nonlinear filter demodulator is based on a model comprising a constant carrier phase offset and a plurality of sets of variables comprising a set of auxiliary variables, a set of instantaneous frequency variables, and a set of instantaneous phase variables.

Example 26 is a wireless communication network comprising a first wireless device, which is the wireless device of any of Examples 1-4; and a second wireless device communicating with the first wireless device.

In Example 27, the subject matter of any of Examples 10-13 can optionally include estimating, by an estimator, a modulation index of the received signal; and equalizing, by an equalizer, the estimated modulation index to a predefined modulation index.

In Example 28, the subject matter of any of Examples 10-13, wherein the detecting step is performed using Maximum Likelihood Sequence Detection (MLSD).

Example 29 is a computer program product embodied on a non-transitory computer-readable medium comprising program instructions configured such that when executed Examples processing circuitry cause the processing circuitry to implement the method of any of claims 10-13.

In Example 30, the subject matter of any of Examples 17-20 can optionally include an estimating means for estimating a modulation index of the received signal; and an equalizing means for equalizing the estimated modulation index into a predefined modulation index.

In Example 31, the subject matter of any of Examples 17-20, wherein the detection means is a Maximum Likelihood Sequence Detector.

Example 32 is an apparatus substantially as shown and described.

Example 33 is a method substantially as shown and described.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein.

The invention claimed is:

1. A wireless device, comprising:
a receiver configured to receive a signal having in-phase and quadrature components;
a non-linear filter demodulator configured to translate noncoherently the in-phase and quadrature components into phase and/or frequency domain signals, and to estimate and correct carrier frequency offset;
a signal parameter acquisitioner configured to estimate and correct at least one signal parameter based on the in-phase and quadrature components and the phase and/or frequency domain signals;
an estimator configured to estimate a modulation index of the received signal; and
an equalizer configured to equalize the estimated modulation index to a predefined modulation index; and
a detector configured to detect information in the phase or frequency domain signal.

2. The wireless device of claim 1, wherein:
the signal parameter acquisitioner configured to estimate and correct carrier phase offset and carrier timing offset based on the in-phase and quadrature components and the phase and/or frequency domain signals, and
the detector is further configured to detect information in the phase domain signal.

3. The wireless device of claim 1, wherein:
the signal parameter acquisitioner configured to estimate and correct carrier timing offset based on the in-phase and quadrature components and the frequency domain signal, and
the detector is further configured to detect information in the frequency domain signal.

4. The wireless device of claim 1, wherein the detector is a Maximum Likelihood Sequence Detector (MLSD).

5. A wireless communication network comprising:
a first wireless device, which is the wireless device of claim 1; and
a second wireless device communicating with the first wireless device.

6. The wireless communication network of claim 5, wherein the wireless communication network is a low-power wireless sensor and actor network (LP-WSAN), the first wireless device is an actor, and the second wireless device is a sensor.

7. A wireless device, comprising:
a receiver configured to receive a signal having in-phase and quadrature components;
a non-linear filter demodulator configured to translate noncoherently the in-phase and quadrature components into phase and/or frequency domain signals, and to estimate and correct carrier frequency offset;
a signal parameter acquisitioner configured to estimate and correct the carrier frequency offset, carrier phase offset, and carrier timing offset based on the in-phase and quadrature components and the phase and/or frequency domain signals, wherein the estimation and correction of the carrier frequency offset performed by the signal parameter acquisitioner is more precise than that performed by the non-linear filter demodulator; and
a detector configured to detect information in the phase and frequency domain signal.

8. A wireless device, comprising:
a receiver configured to receive a signal having in-phase and quadrature components;
a non-linear filter demodulator configured to translate noncoherently the in-phase and quadrature components into phase and/or frequency domain signals, and to estimate and correct carrier frequency offset, wherein the nonlinear filter demodulator is based on a model comprising a constant carrier phase offset and a plurality of sets of variables comprising a set of auxiliary variables, a set of instantaneous frequency variables, and a set of instantaneous phase variables;
a signal parameter acquisitioner configured to estimate and correct at least one signal parameter based on the in-phase and quadrature components and the phase and/or frequency domain signals; and
a detector configured to detect information in the phase or frequency domain signal.

9. A method of wireless communication, comprising:
receiving, by a receiver, a signal having in-phase and quadrature components;
translating noncoherently, by a non-linear filter demodulator, the in-phase and/or quadrature components into phase and frequency domain signals;
estimating and correcting, by the non-linear filter demodulator, carrier phase offset;
estimating and correcting, by a signal parameter acquisitioner, at least one signal parameter based on the in-phase and quadrature components and the phase and/or frequency domain signals;
estimating, by an estimator, a modulation index of the received signal; and
equalizing, by an equalizer, the estimated modulation index to a predefined modulation index; and
detecting, by a detector, information in the phase and/or frequency domain signal.

10. The method of claim 9, wherein:
the at least one signal parameter is the carrier frequency offset, carrier phase offset, and carrier timing offset,
estimating and correcting, by the signal parameter acquisitioner, is of the carrier frequency offset, carrier phase offset, and carrier timing offset based on the in-phase and quadrature components and the phase and/or frequency domain signals,
the estimating and correcting of the carrier frequency offset performed by the signal parameter acquisitioner is more precise than that performed by the non-linear filter demodulator, and
the detecting is detecting information in the phase domain signal.

11. The method of claim 9, wherein:
the estimating and correcting, by the signal parameter acquisitioner, is of carrier phase offset and carrier timing offset based on the in-phase and quadrature components and the phase and/or frequency domain signals, and the detecting is detecting information in the phase domain signal.

12. The method of claim 9, wherein:

the estimating and correcting, by the signal parameter acquisitioner, is of carrier timing offset based on the in-phase and quadrature components and the frequency domain signal, and the detecting is detecting information in the frequency domain signal.

13. The method of claim 9, wherein the detecting step is performed using Maximum Likelihood Sequence Detection (MLSD).

14. A computer program product embodied on a non-transitory computer-readable medium comprising program instructions configured such that when executed by processing circuitry cause the processing circuitry to implement the method of claim 9.

15. A wireless device, comprising:

a receiving means for receiving a signal having in-phase and quadrature components;

a non-linear filtering demodulating means for translating noncoherently the in-phase and quadrature components into phase and/or frequency domain signals, and for estimating and correcting carrier frequency offset;

a signal parameter acquisition means for estimating and correcting at least one signal parameter based on the in-phase and quadrature components and the phase and/or frequency domain signals;

an estimating means for estimating a modulation index of the received signal; and an equalizing means for equalizing the estimated modulation index into a predefined modulation index; and a detection means for detecting information in the phase and/or frequency domain signal.

16. The wireless device of claim 15, wherein:

the signal parameter acquisition means is for estimating and correcting the carrier frequency offset, carrier phase offset, and carrier timing offset based on the in-phase and quadrature components and the phase and/or frequency domain signals, the detecting means is further for detecting information in the phase domain signal.

17. The wireless device of claim 15, wherein:

the signal parameter acquisition means is for estimating and correcting carrier phase offset and carrier timing offset based on the in-phase and quadrature components and the phase and/or frequency domain signals, and the detecting means is further for detecting information in the phase domain signal.

18. The wireless device of claim 15, wherein:

the signal parameter acquisition means is for estimating and correcting carrier timing offset based on the in-phase and quadrature components and the frequency domain signal, and the detector is further for detecting information in the frequency domain signal.

19. The wireless device of claim 15, wherein the detection means is a Maximum Likelihood Sequence Detector.

* * * * *